May 11, 1948.  R. J. KENT  2,441,153
CABLE LAYING MACHINE
Filed April 11, 1944   7 Sheets-Sheet 1

FIG. I

INVENTOR
R. J. KENT
BY
Walter C. Kiesel
ATTORNEY

May 11, 1948.   R. J. KENT   2,441,153
CABLE LAYING MACHINE
Filed April 11, 1944   7 Sheets-Sheet 2

FIG. 2

INVENTOR
R. J. KENT
BY
Walter C. Kiesel
ATTORNEY

May 11, 1948.　　　　　R. J. KENT　　　　　2,441,153
CABLE LAYING MACHINE
Filed April 11, 1944　　　　　7 Sheets-Sheet 3

FIG. 3

INVENTOR
R. J. KENT
BY
Walter C. Kiesel
ATTORNEY

May 11, 1948.   R. J. KENT   2,441,153
CABLE LAYING MACHINE
Filed April 11, 1944   7 Sheets-Sheet 4

INVENTOR
R. J. KENT
BY
Walter C. Kiesel
ATTORNEY

May 11, 1948.    R. J. KENT    2,441,153
CABLE LAYING MACHINE
Filed April 11, 1944    7 Sheets-Sheet 6

INVENTOR
R. J. KENT
BY
Walter C. Kiesel
ATTORNEY

Fig. 10

Patented May 11, 1948

2,441,153

UNITED STATES PATENT OFFICE 2,441,153

CABLE LAYING MACHINE

Robert J. Kent, Summit, N. J., assignor to Bell Telephone Laboratories, Incorporated, New York, N. Y., a corporation of New York Application April 11, 1944, Serial No. 530,567

3 Claims. (Cl. 111—5)

This invention relates to cable or wire laying machines and more particularly to cable or wire laying plows operable to lay a cable or a wire line in the ground.

An object of the invention is to provide an improved plow for laying a cable or wire below the surface of the ground.

One feature of the invention resides in a novel form of plowshare which is operable to lay the wire below the surface of the ground.

Another feature resides in the supporting means for the plowshare.

Another feature resides in a system of sheaves carried on the plow and operable to guide the wire to the plowshare.

In some cases in order to quickly establish electrical communication facilities between distant points a wire line is run from one station to another by simply laying the wire line on the surface of the ground wherever it is convenient. At some points the wire line may be extended through culverts to pass under roads. At other points the wire line may be elevated on poles to extend the wire line across a water course or the wire line may be laid in the bed of a stream. The wire line in some cases may comprise several lengths of wire connected in end-to-end relation by means of electrical connectors or the ends may be connected by splicing. It is often a desideratum to bury portions of the wire line beneath the surface of the ground without disrupting the electrical communication facilities already established and without disturbing the points where portions of the wire line is connected or where the wire line is elevated on poles or extended through streams or culverts.

The plow embodied in this invention provides a ready means for laying a wire or a plurality of wires under ground and is found particularly useful in burying a wire line or portions thereof after the wire line has been initially laid out on the ground surface.

The plow is constructed and arranged so that a wire may pass downwardly through the plowshare and into the ground while the plow is operating to plow the ground. The wire may be readily inserted in the plowshare or removed therefrom without cutting the wire or without disturbing any of the connectors or any parts of the wire line not required to be buried beneath the ground surface.

Figure 1:
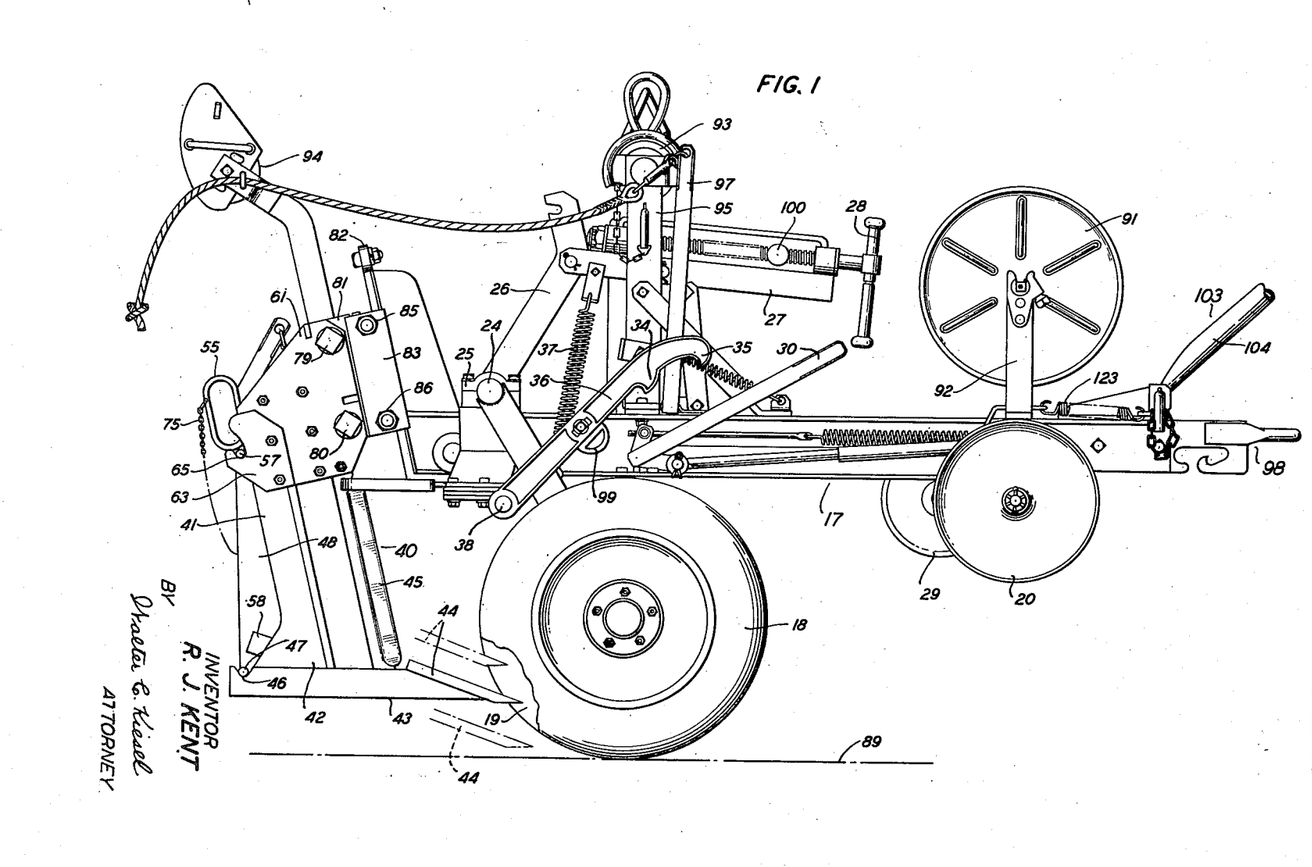
Fig. 1 is a side elevation of the plow embodying the invention.
Figure 2:
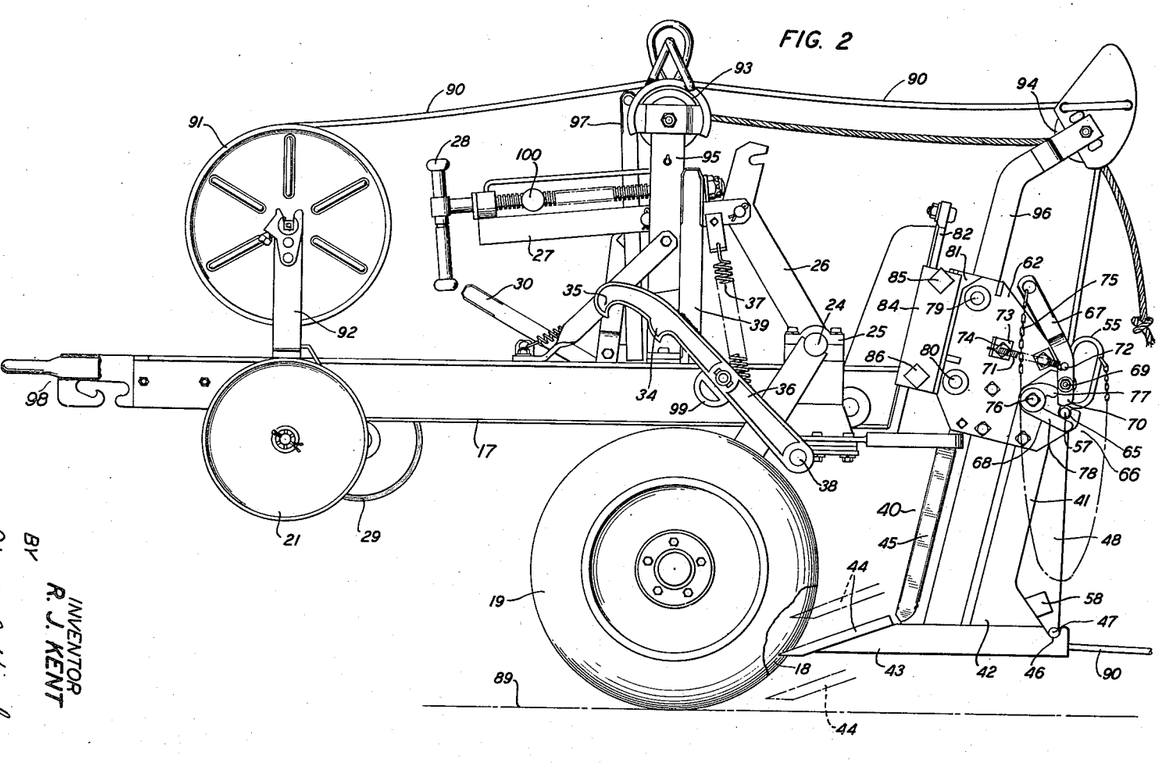
Fig. 2 is a view corresponding to Fig. 1 but showing the opposite side of the plow.
Figure 3:
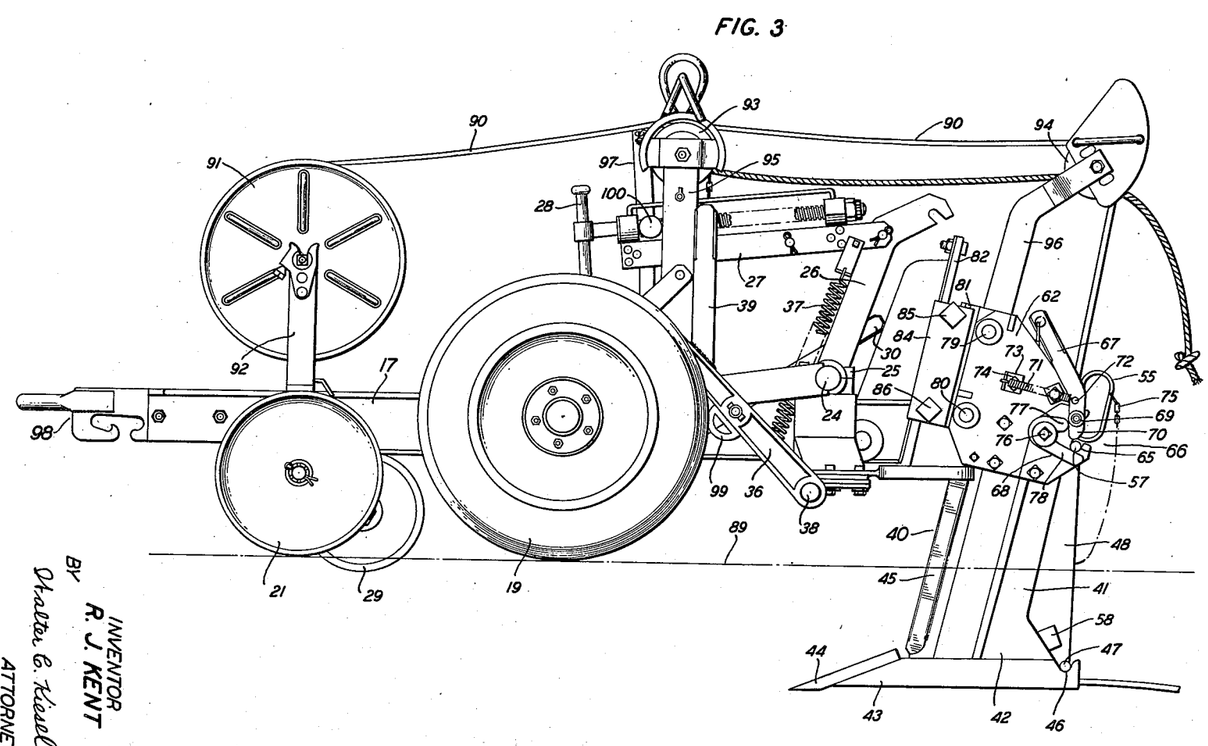
Fig. 3 is a view corresponding to Fig. 2 but with the chassis lowered and the plowshare extending into the ground.

As shown in Figs. 1, 2 and 3 the plow comprises a chassis 17 mounted on rear wheels 18 and 19 and front wheels 20 and 21. The rear wheels 18 and 19 are of larger diameter than the front wheels 20 and 21 and are mounted on spindles 22 and 23, respectively, supported in and projecting from the ends of a U-shaped axle 24 which extends across the chassis 17 and is rotatably supported in bearings 25 mounted on the chassis 17. The axle 24 is equipped with an arm 26 which is in mechanical connection with a mechanism 27 involving a handle 28 through the operation of which the axle 24 may be rotated to raise and lower the chassis 17 relative to the wheels 18 and 19, all of which is more or less standard to agricultural plows and does not form any part of the present invention. Located on the forward portion of the plow and between the wheels 20 and 21 is a rotatable coulter 29 to initially score the ground ahead of the plowshare. The coulter 29 may be raised and lowered relative to the chassis 17 by operation of a lever system involving the lever 30.

Figure 8:
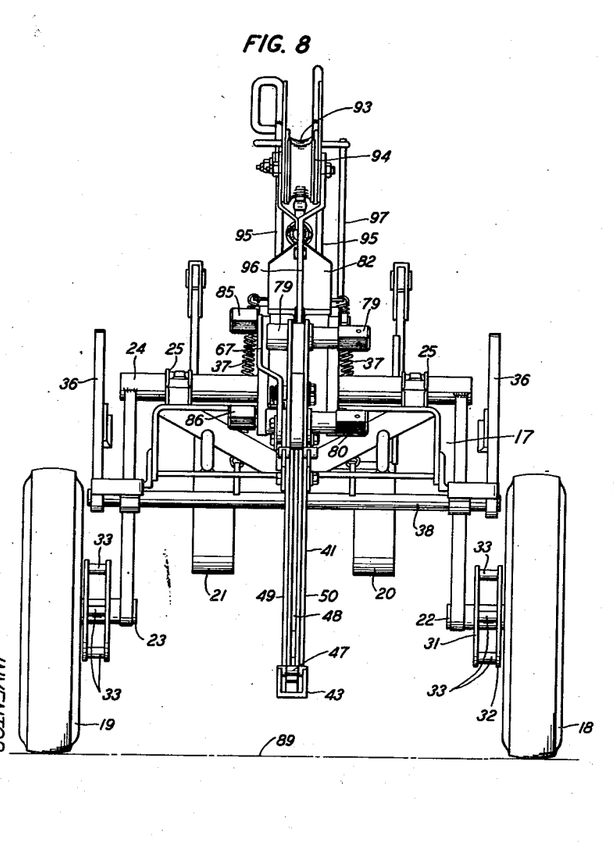
Figs. 8 and 9 are rear and front views respectively of the plow.
Figure 9:
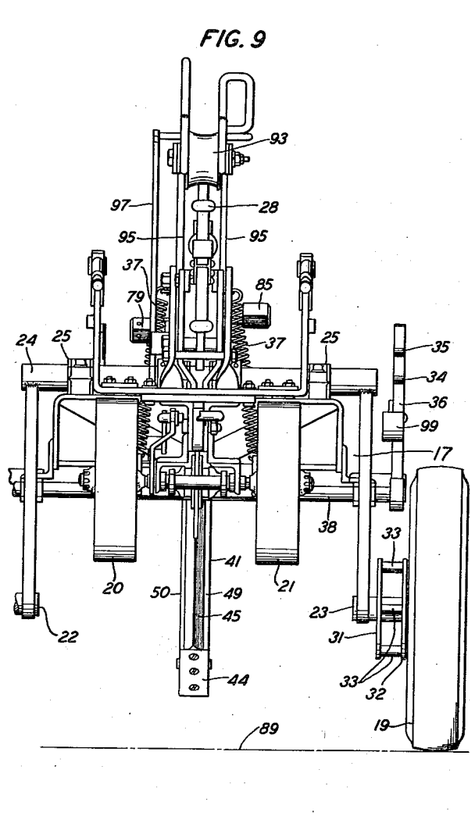

The wheels 18 and 19, as shown in Figs. 8 and 9, are equipped with spaced plates 31 and 32 carrying spaced pins 33 which may be engaged by hooks 34 or 35 provided on pivotally supported bars 36 normally held against operation by means of springs 37. The bars 36 are mounted on a shaft 38 and one of the bars 36, as shown in Figs. 2 and 3, is equipped with a handle 39 through the manual operation of which the bars 36 may be pivotally moved so that the hooks 34 or 35 will engage the pins 33 to hold the wheels 18 and 19 against forward rotation. When the hooks 34 or 35 are moved into holding engagement with the pins 33 the rotation of the wheels 18 and 19 causes the chassis 17 to be pulled forwardly and upwardly with respect to the axes of the wheels 18 and 19.

A plowshare 40 is carried on the rear portion of the chassis 17 to plow the ground and deposit a wire below the surface of the ground. The plowshare 40 comprises a hollow standard 41 having an enlarged lower end 42 to which a foot 43 is secured. The rear of the standard 41 is open to provide a gateway through which a wire may be moved laterally into the standard 41, the gateway being defined by side walls of the standard 41. The foot 43 is channel-shaped in cross-section. The forward end of the foot 43 is provided with a blade 44 to plow the ground when the plowshare 40 is correctly positioned to perform this function. The forward portion of the standard 41 is provided with a beveled shin 45 to cooperate with the blade 44 in plowing the ground. The rear portion of the foot 43 is open and is notched as shown at 46 to receive a cross pin 47 on the lower end of a removable gate 48 which is normally carried by the standard 41. The gate 48 when mounted on the standard 41 fits between the spaced side walls 49 and 50 of the standard 41 and substantially fills the space between the side walls 49 and 50 at the rear of the standard 41. The gate 48 in cooperation with the walls 49 and 50 of the standard 41 forms an enclosure through which the wire passes during the laying of the wire below the surface of the ground.

Figure 4:
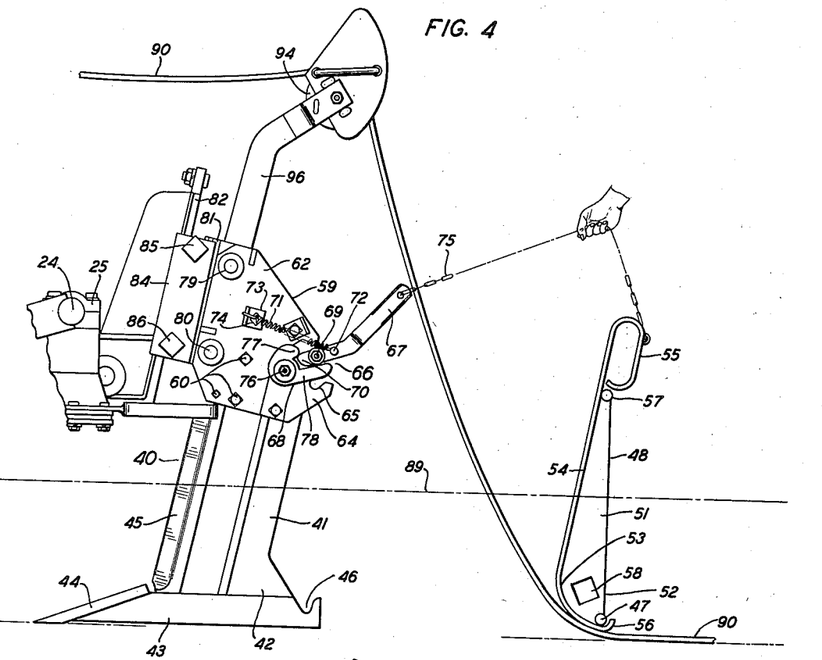
Fig. 4 is a side elevation of the plowshare and parts associated therewith and with one of the parts of the plowshare removed from its normal position.

In Fig. 4 the structure of the gate 48 is clearly shown, the gate 48 being removed from the standard 41. As shown in this figure the gate 48 comprises a blade-like body 51 having a widened lower end portion 52 and a curved edge portion 53 which conforms to the shape of a J-shaped edge strip 54 which is of sufficient length and width to substantially close the opening in the back of the standard 41. The edge strip 54 is secured to the curved edge of the body 51 and is extended above the top of the body 51 and formed to provide a loop-shaped handle 55. The lower end of the edge strip 54 is continued slightly beyond the rear edge of the body 51 and is turned upwardly to provide a curved heel 56 on the lower end of the gate 48. A cross pin 57 is provided on the upper end of the body 51 and below the handle 55. The lower end of the body 51 is apertured at 58 to receive a nut or the head of a bolt so that the gate 48 may be used as a wrench when the gate 48 is removed from the plowshare 40.

The standard 41 of the plowshare 40 is suspended from a support 59 and is secured thereto by means of bolts 60 or other suitable fastening means. The support 59 comprises two plates 61 and 62 apertured to receive the bolts 60 and held in parallel spaced relation according to the thickness of the standard 41. Supported on the lower rear corners of the plates 61 and 62 are plates 63 and 64, respectively, each of which has a notch 65 formed therein to receive the cross pin 57 provided on the gate 48. It will be seen, therefore, that the gate 48 is held in place on the rear portion of the plowshare 40 when the cross pin 47 on the lower end of the gate 48 is in the notches 46 on the foot 43 and the cross pin 57 on the gate 48 is in the notches 65 on the plates 63 and 64.

To normally hold the gate 48 in required position on the plowshare 40 and to enable quick removal of the gate 48 from the plowshare 40 a releasable latch and gate lifting device 66 is provided. The device 66 comprises a lever 67 and a tumbler 68. The lever 67 is pivotally supported on a bolt 69 which extends through an aperture in the lever 67 and through apertures in the plates 61, 62, 63 and 64. The lever 67 as shown in Figs. 2 and 3 has a toe portion 70 extending beyond the pivotal point of support of the lever 67 and so that the toe portion 70 will normally extend above and in engagement with the cross pin 57 of the gate 48 to hold the cross pin 57 in the notches 65 and thus prevent upward movement of the gate 48 relative to the plowshare 40. A spring 71 is provided to normally hold the lever 67 against pivotal movement from this position, the spring 71 being secured at one end to the lever 67 at a point 72 above the pivotal point of support of the lever 67 and being secured to its other end to a bracket 73 mounted on the plate 62 by means of a bolt 74. The lever 67 may be pivotally moved against the action of the spring 71 by manually pulling on a chain 75 in the required direction. One end of the chain 75 is secured to the upper end of the lever 67 and the other end of the chain 75 is secured to the handle 55 of the gate 48.

The tumbler 68 is U-shaped and the closed end portion is apertured and pivotally mounted on a bolt 76 which extends through apertures in the plates 61, 62, 63 and 64. The tumbler 68 is supported in parallel relation with the outer face of the plate 62 and has one leg member 77 extending into abutting relation with a forward edge of the toe portion 70 of the lever 67. The other leg member 78 of the tumbler 68 is longer than the leg member 77 and normally extends below and past the base of the notch 65 in the plate 62 and directly under and in engagement with the cross pin 57 on the gate 48. When the lever 67 is pulled against the action of the spring 71 the toe portion 70 causes upward pivotal movement of the tumbler 68 so that the gate 48 is moved upwardly by means of the leg member 78. The tumbler 68 has sufficient range of pivotal movement to lift the gate 48 to a sufficient extent to bring the cross pins 47 and 57 out of the respective notches 46 and 65 when the lever 67 is moved to the position shown in Fig. 4. In this figure the gate 48 is entirely removed from the plowshare 40 and the plow has been moved away from the gate 48.

The support 59 is located on the rear of the chassis 17 and is secured by means of bolts 79 and 80 to a flanged and apertured mounting plate 81 which is clamped to a sternpost 82 by means of flanged clamp plates 83 and 84 which are held in clamping engagement with the sternpost 82 by means of bolts 85 and 86. The sternpost 82 is mounted on the rear of the chassis 17 and slopes upwardly and rearwardly of the chassis 17. The clamp plates 83 and 84 have frictional engagement with the sternpost 82 and the support 59 may be moved upwardly or downwardly when the bolts 85 and 86 are loosened. It will be seen, therefore, that the plowshare 40 and its support 59 may be raised and lowered on the stern post 82 to change the depth of plowing.

Figure 5:
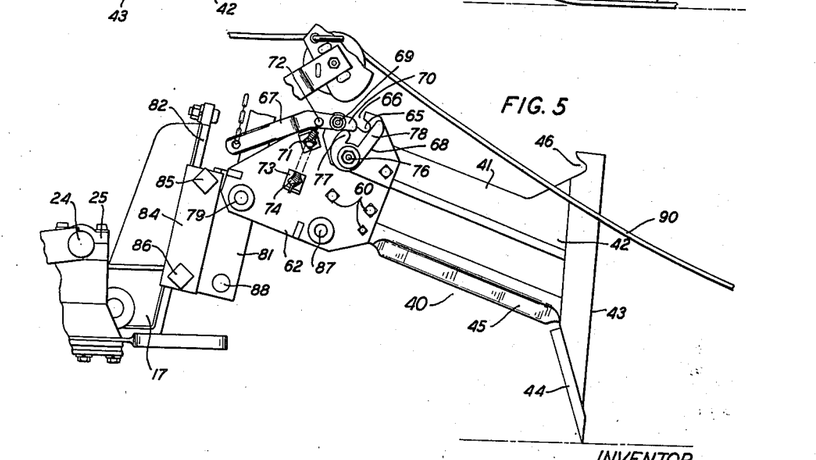
Fig. 5 is a side elevation of the plowshare and its supporting means and with the plowshare swung upwardly from its normal position and extending rearwardly of the chassis of the machine.
Figure 6:
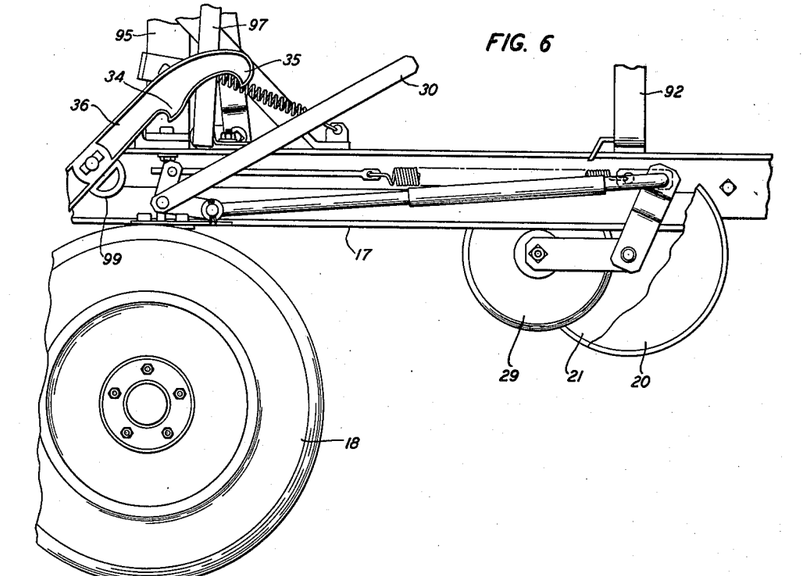
Fig. 6 is a side elevation of a portion of the plow and shows the coulter and the supporting means for the coulter.
Figure 7:
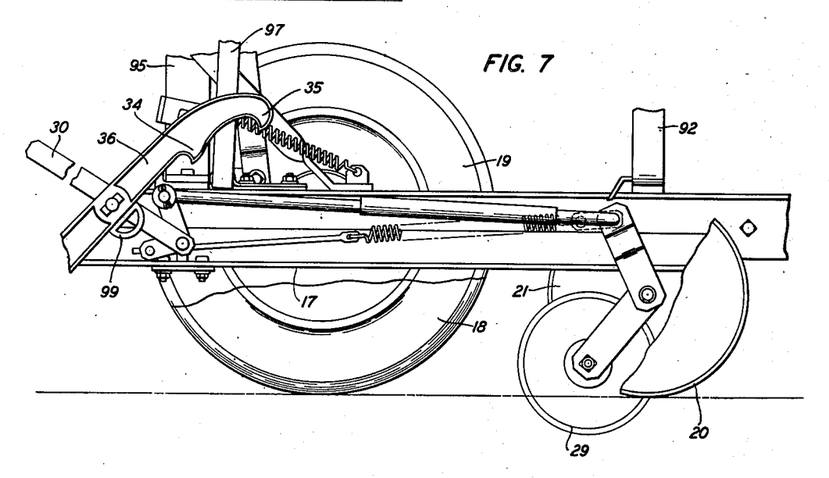
Fig. 7 is a view corresponding to Fig. 6 but with the coulter and the chassis in lowered position relative to the position shown in Fig. 6.

The plowshare 40 as shown in Fig. 5 may be swung rearwardly of the chassis 17 by removing the bolt 80 from its accommodating aperture 87 in the mounting 59 and from the corresponding aperture 88 in the mounting plate 81 and by applying a forward pulling force to the chassis 17 while the plowshare 40 is in engagement with the ground.

In some wire laying jobs in which the plow of this invention is used in laying the wire or cable beneath the surface of the ground 89 and as shown in Figs. 2 and 3, a supply of the wire 90 is carried on a rotatable reel 91 supported on reel supports 92 which are mounted on the forward portion of the chassis 17. In this case the wire 90 is led from the reel 91 and over sheaves 93 and 94 suitably supported on the plow, the sheave 93 being supported on an upright 95 extending upwardly from the chassis 17 and the sheave 94 being supported on a rod 96 extending upwardly from the rear portion of the plow. After passing through the sheave 94 the wire 90 extends downwardly through the hollow space in the standard 41 and into the channel provided in the foot 43. The wire 90 is then led outwardly through the back of the foot 43 as shown in Fig. 2. In order to extend the wire 90 through the standard 41 and into the foot 43 it is not necessary to thread the wire 90 through these parts since the gate 48 may be removed from the plowshare 40 to open the back of the plowshare 40 for insertion of the wire 90 therein. After the wire 90 has been placed within the plowshare 40 the gate 48 may be placed in the position shown in Fig. 2 to insure that the wire 90 will be fed through the plowshare 40 in the passage of the wire 90 from the storage reel 91 to the ground 89.

The plowshare 40 may be brought into engagement with the ground 89 by operating the trip lever 97 which operates in a well-known manner in agricultural plows to operate the mechanism 27 to let the chassis 17 move downwardly relative to the wheels 18 and 19 to let the plowshare 40 enter the ground and take a position below the surface of the ground 89 as shown in Fig. 3. When the plowshare 40 extends below the surface of the ground 89 as illustrated in Fig. 3 and the plow is forwardly moved the wire 90 is laid below the surface of the ground 89.

The plow is usually drawn forwardly by means of a motor driven tractor or truck, not shown, but, which may be connected to the forward end of the plow by means of a tow line, one end of which may be secured to a hook means 98 provided on the forward end of the chassis 17. When it becomes necessary or desirable to withdraw the plowshare 40 from the ground 89 the chassis 17 may be raised relative to the wheels 18 and 19 by holding the wheels 18 and 19 against forward rotation while the chassis 17 is pulled forwardly. The wheels 18 and 19 may be held against forward rotation by means of the bars 36 which may be swung downwardly by manual operation of the handle 39 to bring the hooks 34 or 35 into holding engagement with the pins 33 carried by the wheels 18 and 19. When the wheels 18 and 19 are held against forward rotation by means of the bars 36 and the chassis 17 is moved forwardly and upwardly in the well-known manner, semicircular cams 99 provided on the bars 36 are moved into engagement with the pins 33 to cause the bars 36 to swing upwardly to release the hooks 34 or 35 from engagement with the pins 33. The springs 37 return the bars 36 to their normally raised position when the hooks 34 or 35 are withdrawn from the pins 33.

In the operation of burying the wire 90 a certain point may be reached where it becomes necessary or desirable to release the wire 90 from passage through the plowshare 40 in order that a new length of wire may be coupled to a previously laid length or in order that a portion of the wire line may be extended above the surface of the ground or extended through a culvert, a stream or strung on poles to cross an area where underground laying of the wire is undesirable or impracticable. In such cases the gate 48 is removed from the plowshare 40 to let the wire 90 come entirely out of the plowshare 40 as shown in Fig. 4. Release of the gate 48 from the plowshare 40 is accomplished by manually applying a pull to the chain 75 to pull the lever 67 rearwardly of the plow. When a backward pull is applied to the lever 67 the toe portion 70 of the lever 67 is removed from engagement with the cross pin 57 on the gate 48 and operates the tumbler 68 to lift the gate 48 sufficient to remove the cross pins 47 and 57 from the notches 46 and 65, respectively, as shown in Fig. 4. The gate 48 may be left holding a portion of the wire 90 in the ground while the plow is moved forwardly a short distance allowing the wire 90 to come entirely out of the plowshare 40 through the opening made in the rear of the plowshare 40 by removal of the gate 48. In order to again place the wire 90 in the plowshare 40 the plow is operated to raise the plowshare 40 out of the ground 89, the wire 90 is then replaced in the plowshare 40 and the gate 48 is placed in position to close the opening in the back of the plowshare 40.

The depth of plowing may be adjusted in a well-known manner by suitable adjustment of the position of a nut 100 in the mechanism 27 to change the distance the nut 100 may move in one direction before it engages the upright 95 to limit the backward and downward movement of the chassis 17 relative to the wheels 18 and 19. The depth of plowing may be also adjusted, however, by moving the support 59 upward or downward on the sternpost 82 as previously described.

Since the wire 90 may be readily removed from the plowshare 40 and may be readily replaced therein without severing the wire 90 or having to thread it through the plowshare 40 a wire 90 previously laid on the surface of the ground 89 may be picked up at various points where underground plowing of the wire is desired and inserted in the plowshare 40 so that upon operation of the plow the wire 90 will be deposited below the surface of the ground at the desired points. In this case the wire 90 may be led over the sheaves 93 and 94 to at first elevate the wire and then feed it downwardly through the plowshare 40, the wire 90 then coming out through the rear of the foot 43 and below the surface of the ground 89.

Figure 10:
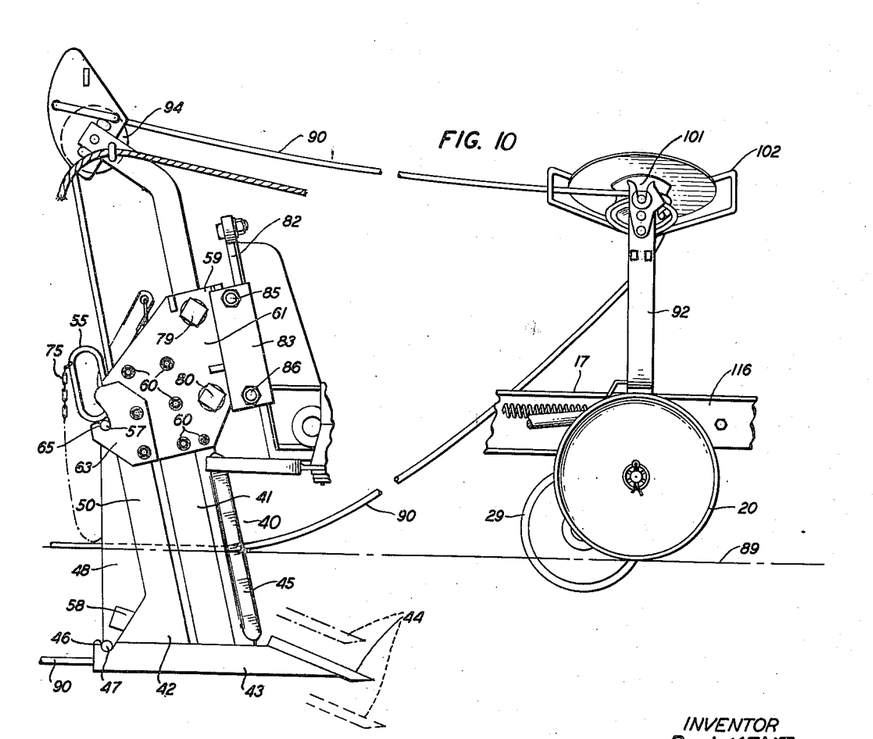
Fig. 10 is a side elevation of the forward and rear portions of the plow together with a sheave mounted on the forward portion and guiding a cable from the ground surface to a position for feeding the cable to the plowshare.

In Fig. 10 a sheave 101 equipped with a guide 102 is provided to elevate the wire 90 in its passage from the surface of the ground 89 to the sheaves 93 and 94. The sheave 101 may be constructed so that it may be mounted on the reel support 92 and arranged so that it will guide the wire 90 from a position alongside the plow to the sheave 94, the wire 90 having been previously laid on the surface of the ground 89 in a line substantially parallel to the desired line of underground laying of the wire 90.

What is claimed is:

1. A plow for laying a wire beneath the surface of the ground comprising a hollow plowshare having a gateway through which the wire may be inserted in the plowshare, a removable gate supported on the plowshare and closing the gateway, a releasable latch engaging said gate to normally hold said gate on the plowshare and a tumbler engaging said latch and said gate and operable by means of said latch to lift said gate relative to said plowshare to permit withdrawal of said gate from said plowshare.

2. A plow for laying a wire beneath the surface of the ground having a plowshare comprising a hollow standard formed to provide a gateway through which the wire may be laterally moved to insert the wire in said standard and withdraw the wire therefrom, a mounting for said standard and having notches formed therein, a hollow foot on said standard through which the wire may be longitudinally moved to withdraw the wire from the plowshare, said foot having notches formed therein, a removable gate to close the gateway in said standard, cross pins mounted on said gate and engageable in the notches in said mounting and said foot to hold said gate in position, a releasable latch engaging said gate to normally hold said gate against upward movement and a tumbler engaged by said latch and engaging one of said cross pins and operable by means of said latch to lift said gate to release said cross pins from the notches to permit removal of said gate from said standard.

3. A plow for laying a wire beneath the surface of the ground comprising a hollow plowshare having a gateway through which the wire may be inserted in the plowshare, a removable gate supported on the plowshare and closing the gateway, a releasable latch engaging said gate to normally hold said gate on the plowshare, a tumbler engaging said latch and said gate and operable by means of said latch to lift said gate relative to said plowshare to permit withdrawal of said gate from said plowshare, said plowshare and its associated latch and gate mechanism being pivotally and adjustably supported at the rear of said plow.

ROBERT J. KENT.

REFERENCES CITED

The following references are of record in the file of this patent:

UNITED STATES PATENTS

| Number | Name | Date |
|---|---|---|
| 1,520,825 | Kinlaw | Dec. 30, 1924 |
| 1,668,277 | Kirby | May 1, 1928 |
| 1,957,991 | Bloodworth | May 8, 1934 |
| 2,139,212 | Tonjes | Dec. 6, 1938 |
| 2,210,792 | Boor | Aug. 6, 1940 |
| 2,254,324 | Sjogren et al. | Sept. 2, 1941 |
| 2,345,929 | Freeman | Apr. 4, 1944 |